June 30, 1936.  A. L. SPAFFORD  2,045,733
INSULATION STRUCTURE
Filed Oct. 16, 1931   2 Sheets-Sheet 1

Inventor
Allen L. Spafford
By W. Bartlett Jones, Atty.

Witness:
Chas. R. Koursh.

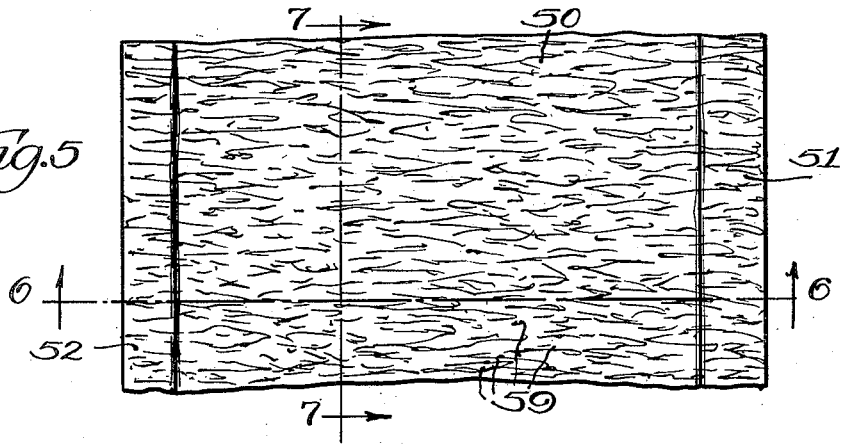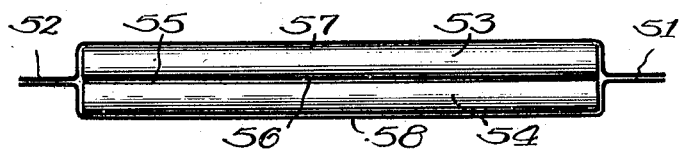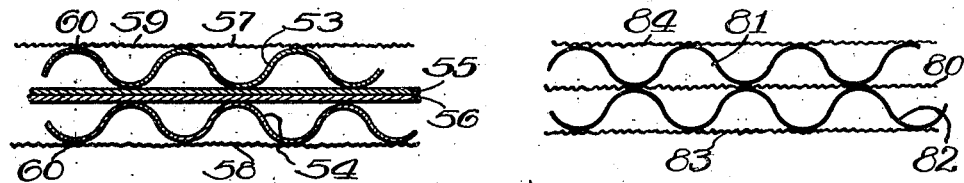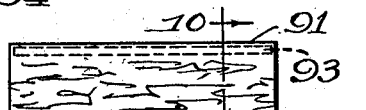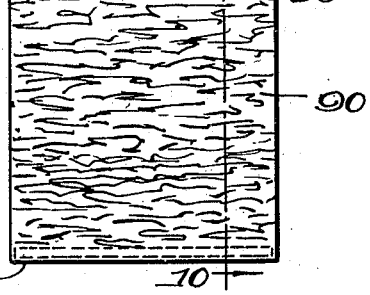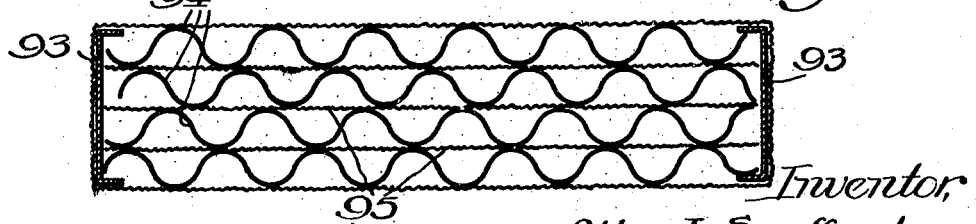

Patented June 30, 1936

2,045,733

UNITED STATES PATENT OFFICE 2,045,733

INSULATION STRUCTURE

Allen L. Spafford, Cloquet, Minn., assignor to Wood Conversion Company, Cloquet, Minn., a corporation of Delaware Application October 16, 1931, Serial No. 569,197

8 Claims. (Cl. 154—45)

The present invention relates to insulation structures, especially for heat, but useful for sound. It has particular reference to the use of corrugated sheets, such as the so-called corrugated boards or papers. It also has reference to flexible forms of insulation structures employing the flexible and elastic and flexible structures and elements disclosed in my copending U. S. application Serial No. 569,198, filed concurrently herewith.

In insulation for heat, a considerable thickness of material is essential for effectiveness of insulation, especially against heat and cold. Heretofore, the insulation has been provided in rigid forms and in flexible forms, and in slabs or packages. The latter may be rigid, or flexible, or resilient, or partly both, such as packages or slabs which are reinforced as described in the U. S. Corlette application Serial No. 480,967, filed September 10, 1930. One flexible form is well known under the name "Balsam wool", and is described in the U. S. Weiss Patents Nos. 1,336,402, 1,336,403, and 1,336,404.

Rigid insulation for large structures, such as houses, is not as desirable as flexible insulation because the long spaces, in floors, walls and ceilings can more easily be equipped with flexible insulation which may be provided in rolls, which may be handled more easily, which may be installed on curved areas, which may be bent around corners, and which may be tucked in where rigid insulation could not be used.

Much of the insulation provided heretofore, is fibrous in character, and sheets or blankets of such fibrous material have varying degrees of flexibility according to the specific materials and construction. The dead air spaces in the fibers contribute largely to the insulation value. Because corrugated boards and sheets also provide dead air spaces, and because such structures are quickly and cheaply made, and have a specific form, as compared to fibers, it is frequently more economical or desirable to use corrugated structures in some forms of insulation than to use fibers or equivalent material.

One object of the present invention is to form an insulation structure of corrugated sheets.

Another object of the invention is the provision of a pile of corrugated sheets, with a mounting flange for the pile which is an integral part of the corrugated elements of the structure.

Still another object is to form a flexible pile of corrugated sheets, using flexible or elastic corrugated sheets.

Still another object is to provide elasticity and flexibility in an insulation structure comprised of corrugated sheets.

Various other and ancillary objects and advantages of the invention will become apparent from the following description of exemplary embodiments of the invention which are shown in the accompanying drawings in which:

Fig. 5 is a plan view of a fragmentary length of a flexible web of insulation which may be rolled.

Fig. 6 is a cross-section on line 6—6 of Fig. 5.

Fig. 7 is a cross-section on line 7—7 of Figs. 5 and 6.

Fig. 8 is a modified form of structure like Fig. 7.

Fig. 9 is a plan view of a flexible slab.

Fig. 10 is a cross-section on line 10—10 of Fig. 9.

In my copending U. S. application Serial No. 569,198 filed concurrently herewith, I have disclosed new forms of corrugated structures which are useful as elements in this invention. I have there disclosed a single corrugated sheet which may be elastic material, preferably paper creped either parallel with the corrugations, or across them, or doubly and diagonally creped. The same type of materials, and the same relation to the corrugations, may be used for the facings in single-faced or in double-faced corrugated sheets. The plane sheets may be used also in combinations as corrugated sheets or as liners or facings. Numerous combinations are possible, and various degrees of elasticity and flexibility, and directional elasticity and flexibility may be obtained. Such structures may be embodied in various combinations to build up insulation structures.

In accordance with this invention piles of corrugated structures are included in a package form, either with or without other insulation material such as fibers. Packages may be rigid, or elastic, or flexible in one direction or in several directions. Packages may include mounting means as a part of the package. A flexible slab may be made, sealed on all sides. A length or web of insulation may be provided with sealed edges, the web being cut to provide pieces of specified length.

Figure 1:
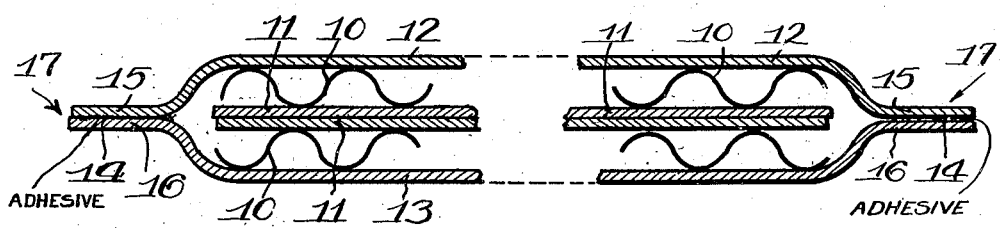
Fig. 1 is a cross-section of a length of insulation, showing a corrugated filler and a wrapper therefor, and flanges for mounting.

In Fig. 1 I show a pile of corrugated structures, which pile presents two faces having corrugations. The open faces are covered with liners which extend beyond the pile and are joined to form a flange which may be used in mounting the insulation. The form shown is merely exemplary of one type of insulating structure. It comprises two single-faced corrugated structures with the faces together. Each has a corrugated sheet 10 and a face 11. Each of the sheets 10 and 11 may be plane or elastic sheets in different combinations, so that desired degrees of elasticity and of flexibility may be secured. The number of corrugated structures in the pile may be increased well over two. It is obvious that one of the facings 11 could be omitted. The lining sheets 12 and 13, may be two sheets as shown or be one sheet formed in the same fashion. Adhesive 14, such as asphalt, is preferred between the faces 15 and 16 which form the flange 17.

The corrugations are shown running parallel with the flanges, but they may run the other way, and then the structure may be rolled in the direction parallel to the flanges. This is especially true where the liners 12 and 13 are elastic, as they may be, when made of creped paper, and the creping is either double and diagonal, or is parallel with the corrugations, and at right angles to the line of the flanges.

Figure 2:
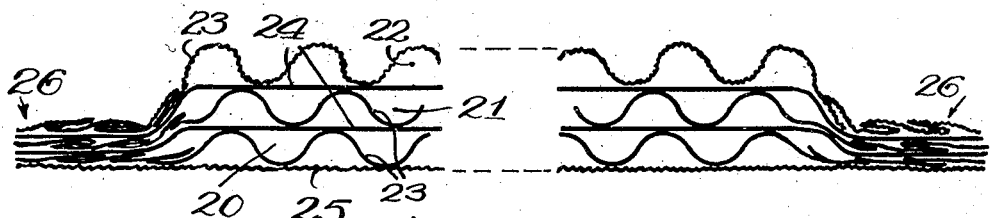
Fig. 2 shows in cross-section another structure showing a pile of corrugated structures altered by jamming to provide a mounting flange.

In Fig. 2, the material of the corrugated elements provides the flanges. Compression of the corrugated structure destroys the air spaces and all the sheets are compressed with overlapping and jamming of excess material derived from compressing the corrugated sheet. The overlapping thus produced renders the flange tough for mounting purposes. In the structure three decks of corrugated elements are illustrated at 20, 21, and 22, each comprising a corrugated sheet 23 and an adjacent sheet 24. The adjacent sheets may act as separators. The separators may be adhesively united to the corrugated sheet, such as they would be by providing three single-faced corrugated sheets. The bottom sheet, or face 25, is preferably water-proof, and preferably creped, so that it is flexible, and tough against puncture. A creped asphalted sheet provides these properties. The top deck is shown as corrugated but it may have in addition a liner or sheet like the sheet 25. The corrugated or other sheet which is exposed is preferably a creped asphalted paper, as shown, which is water-proof and tough.

In manufacture the pile of sheets may rest on a table or platen. A roll or press may press or jam the edge of the intervening pile onto the table or platen to form a flange. Adhesive, (not shown) may first be used between the layers, to cause adherence and to seal the edge. The flange is designated 26, and may appear somewhat exaggerated in thickness for the purpose of illustrating the parts in its structure.

Figure 3:
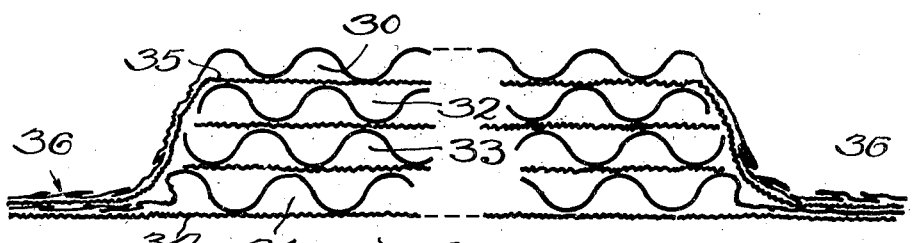
Fig. 3 shows in cross-section another structure in which only a part of the corrugated elements enter the flange structure.

In Fig. 3 a structure is shown which is similar in many respects to that of Fig. 2. It is thicker, however, and has a greater number of elements in the pile. Four are illustrated. As the number of layers in the pile increases the thickness of a flange including all of them in its structure, as in Fig. 2, becomes unnecessarily great. To reduce the thickness, and to make a better product, one or more, or all of the intermediate layers are shorter than the outside layers, so as to have no material entering into the flange. In the structure illustrated the external layers 30 and 31 extend beyond the internal layers 32 and 33. In the present instance the bottom sheet 34 and the top separator 35, are preferably secured to the corrugated sheets of layers 31 and 30, and also enter the flange 36.

Figure 4:
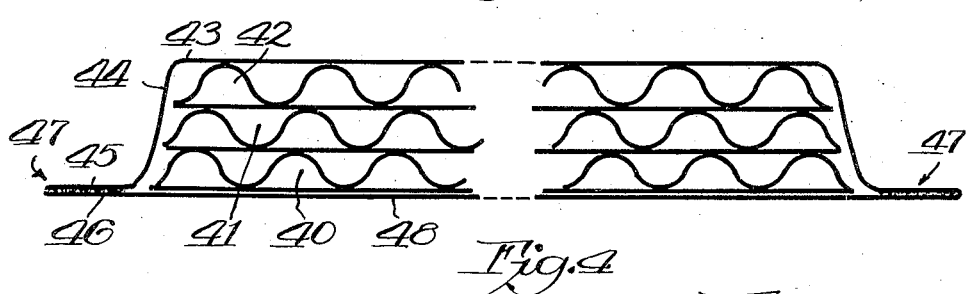
Fig. 4 shows in cross-section another form of corrugated filler and wrapper therefor.

It is to be understood that the sheets in the structures of Figs. 2, 3, and 4 may be elastic sheets, as of creped paper, in whole, or in part, as previously stated, to provide desirable degrees of elasticity and flexibility. All of the non-corrugated sheets are illustrated as being creped parallel to the corrugations. Thus, the structure is very flexible along the corrugations, in spite of its laminated form.

In Fig. 4, the corrugated layers form no part of the flange. Special liners are added to provide flanges, similar to the construction described in my copending application Serial No. 481,830, filed September 15, 1930. The variations there disclosed may be employed, using the corrugated forms rather than the cushions of fiber mat illustrated in said application. According to that application decks may be of different sizes to form one or more slanting side edges.

In Fig. 4, a plurality of structures, such as three single-faced corrugated forms 40, 41, and 42 are piled. Herein they are shown of similar size, but they may taper or vary otherwise. A cover sheet, or liner, 43 passes over the top, down the sides at 44 and outwardly at 45 where it continues as, or is united with another sheet 46 to form a flange 47. The sheet 46 may be a liner extending over the bottom of the pile. At the bottom it is indicated at 48. Although all the sheets are indicated as being uncreped, or non-elastic material, it is to be understood that one, several, or all of the sheets may be elastic, uni-directionally, or universally.

One particularly desirable form of insulation is a flexible form capable of being provided in rolls. It may have a width to permit insertion between studs, and flanges for mounting, sealing, or tucking in, to provide a tight fit, and an easy fit. Such a form may be readily provided in a corrugated structure like that shown in Figs. 5, 6, 7, and 8.

In Fig. 5 a section of a length, as from a roll, is shown in plan view. It has a thick body 50 and thinner flanges 51 and 52. The body has within, two corrugated sheets, such as corrugated plane sheets 53 and 54, each secured to a plane facing, respectively 55 and 56, which lie face to face, and preferably unsecured to each other. Adhesively united to the corrugated sheets 53 and 54 are elastic sheets, such as parallel asphalted and creped paper sheets 57 and 58, of which the creping 59 is parallel to the corrugations. The creped sheets extend beyond the corrugated sheets and are united to each other to provide the flanges 51 and 52. The creping and asphalting may be accomplished in one machine, with hot asphalt, and the heated, sticky asphalted side may be immediately cemented to the corrugated pile at 60. The method of doing this is more particularly described in my copending application Serial No. 557,564, filed August 17, 1931, which further described other specific forms of material which may be used. The flanges may be formed at the same time by pressing the edges together. In this structure the facing sheets 55 and 56, when not elastic, are base sheets which determine the length. The whole may be flexed in either direction. Each of the facings 59 and 60 stretch or contract sufficiently in flexing about the base sheets 55 and 56, and of course the corrugated sheets 53 and 54 yield easily.

In Fig. 8 there is shown a modified form of the structure shown in Figs. 5, 6, and 7. The particular modification is the provision of a single elastic sheet 80, for the non-elastic sheets 55 and 56 of Fig. 7. The structure may be flanged like Fig. 5, and have two corrugated plane sheets 81 and 82, and flexible creped, water-proof asphalted liners 83 and 84. More decks of corrugations and separator sheets, like 80 may be used. The separators and liners are elastic, preferably by providing creping parallel to the corrugations, or by using doubly-creped sheets. It is also preferred that each sheet be united adhesively to the adjacent sheet.

In the form of Fig. 8, all the sheets stretch lengthwise of the structure, and hence the structure stretches lengthwise. It may be bent edgewise as a result of its structure.

In Fig. 9 a simple slab or package is shown which is flexible, particularly along the creping lines 90. The package has rigidified ends or edges 91 and 92, by the provision of a reinforcing sheet, such as a channel form of chip board 93 (Fig. 10). The package comprises layers of corrugated structure, four sheets of corrugated plane paper 94 being shown, with corrugations parallel to the crepings 90. Separator sheets 95 are provided of elastic material, preferably paper with creping parallel to the corrugations. The separator sheets may be adhesively united to one or both of the adjacent corrugated sheets. The pile is wrapped, as a package in an elastic cover, such as water-proofed crepe paper which contains the crepings 90.

The structure may be easily flexed, stretched or compressed in an endwise direction. The ends being rigid, and having the flanges on the channel forms 93 afford places for exerting pressure to insert the slab in a recess, as in a refrigerator construction. The reinforcement may be omitted. Also the diagonally creped material may be used throughout to give flexibility and elasticity in all directions.

Numerous changes and modifications may be made and are herein contemplated as falling within the scope of the invention as defined in the appended claims.

I claim:

1. Insulation comprising in combination a substantially flat-formed pile of corrugated structures having parallel corrugations, means uniting the elements of said pile into a unitary structure, and parallel flexible mounting flanges on said structure running perpendicular to the line of the corrugations.

2. Insulation comprising in combination a substantially flat-formed pile of corrugated structures having parallel corrugations, a liner on one face of the pile, a liner on the other face of the pile, said liners projecting on the same side beyond the pile, and being united to form a flange running perpendicular to the line of the corrugations.

3. Insulation comprising in combination a substantially flat-formed pile of corrugated structures having parallel corrugations, a liner on one face of the pile, a liner on the other face of the pile, said liners projecting on the same side beyond the pile, and being united to form a flange which is continuous with one of the liners and which runs perpendicular to the line of the corrugations.

4. Insulation comprising a substantially flat-formed pile of corrugated sheets, non-corrugated sheets of elastic material, the corrugations all being parallel, the non-corrugated sheets being elastic in the direction at right angles to the corrugations, an elastic envelope containing said pile, and a flange on said envelope.

5. Insulation comprising a substantially flat-formed pile of two corrugated sheets arranged with parallel corrugations, a non-elastic sheet between said corrugated sheets, and a liner on each side of the pile which is elastic in a direction at right angles to the corrugations.

6. Insulation comprising in combination a substantially flat-formed pile of corrugated structures including for said corrugated material at least one facing sheet of creped paper, said pile having an edge jammed into a flat flange in which the creped sheet assures continuity and toughness in the flange.

7. An insulation structure comprising a pile of corrugated sheets with parallel corrugations, elastic sheets between adjacent corrugated sheets with elasticity across the lines of the corrugations, and means to hold the pile together as a flexible unit.

8. An insulation structure comprising a pile of corrugated sheets with parallel corrugations, elastic sheets between adjacent corrugated sheets with elasticity across the lines of the corrugations, elastic lining sheets on the exterior of the pile with elasticity across the lines of the corrugations, and sealing means extending from liner to liner across opposite edges of the pile.

ALLEN L. SPAFFORD.